United States Patent [19]

Westerlund et al.

[11] 4,311,248
[45] Jan. 19, 1982

[54] HIGH PRESSURE COUPLING APPARATUS

[75] Inventors: Herbert A. Westerlund, Port Washington; Robert E. Westerlund, Mequon, both of Wis.

[73] Assignee: Construction Forms, Inc., Cedarburg, Wis.

[21] Appl. No.: 220,817

[22] Filed: Dec. 29, 1980

Related U.S. Application Data

[63] Continuation-in-part of Ser. No. 520,548, Nov. 4, 1974, Pat. No. 3,967,837, and a continuation of Ser. No. 837,534, Sep. 28, 1977, abandoned.

[51] Int. Cl.³ .............................................. F16J 15/02
[52] U.S. Cl. ........................... 277/206 R; 277/207 A; 277/215
[58] Field of Search ............... 277/207 A, 208, 207 R, 277/215, 206 R; 285/112, 365

[56] References Cited

U.S. PATENT DOCUMENTS

| 3,291,506 | 12/1966 | Blakeley | 285/112 |
| 3,351,352 | 11/1967 | Blakeley et al. | 285/112 |
| 3,430,989 | 3/1969 | Wendt | 277/207 A |
| 3,967,837 | 7/1976 | Westerlund | 285/112 |

Primary Examiner—Lenard A. Footland
Attorney, Agent, or Firm—Andrus, Sceales, Starke & Sawall

[57] ABSTRACT

Concrete pumping conduits are connected by releasable hinged couplers. The ends of the conduits include metal pipes formed with annular grooves including a circular peripheral base. The coupler has a cup-shaped cross-section and a sealing gasket is located within the base of the cup-shaped recess with a tongue-like ridge projecting between the two end faces of the pipe ends. The tongue is formed with a rectangular or triangular cross-section. The gasket is provided with small recesses adjacent the ridge with inclined outer sidewalls defining lips in sealing engagement with the conduit. The peripheral ends of the pipes are chamfered and engaged by the sealing lips.

10 Claims, 6 Drawing Figures

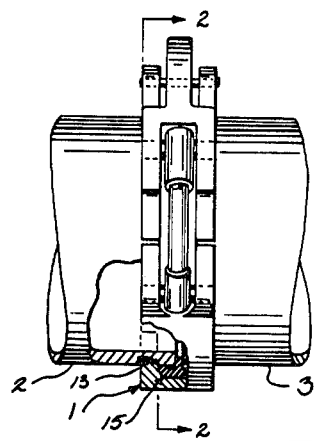
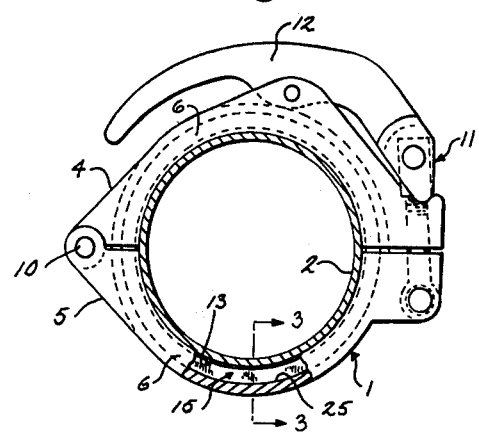
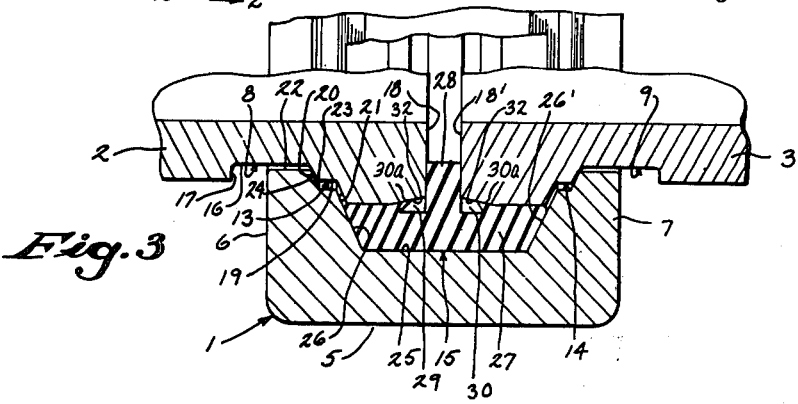
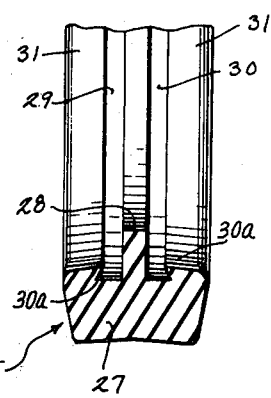
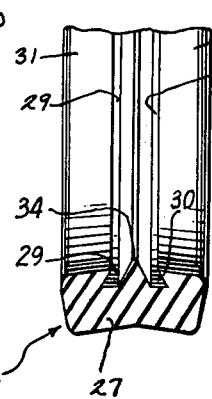

HIGH PRESSURE COUPLING APPARATUS

BACKGROUND OF THE INVENTION

This is a continuation-in-part application of application, Ser. No. 520,548, filed Nov. 4, 1974, U.S. Pat. No. 3,967,837, and a continuation of application Ser. No. 837,534, filed Sept. 28, 1977, abandoned.

The present invention relates to a high pressure coupling apparatus and particularly to a releasable coupling of a pair of pipe sections located in axially end-to-end relationship.

High pressure flow systems may employ suitable conduits which are releasably interconnected for relatively short periods of time. A particular example which has recently been developed is in pumping of concrete on site. In such systems, the concrete may be trucked or otherwise delivered to the installation site and then transferred to the actual drop location through a pressurized pumping system. Each installation is generally unique to the particular installation. In practice, the required system is made from a plurality of standardized pipe sections which are releasably interconnected through a quick coupler for subsequent assembly. For example, U.S. Pat. No. 3,705,737, which issued Dec. 12, 1972 to Robert E. Westerlund, et al, discloses a releasable hinged coupler for interconnecting of the adjacent end of a concrete pumping conduit and the like. In accordance with more or less conventional practice, the encircling coupler halves or sections are formed with a generally U-shaped cross-section defining outer depending leg portions which project into corresponding annular grooves formed in the adjacent pipe ends. A sealing gasket is located within the U-shaped sections banding the joint between the pipe sections to further seal the joint. The gasket is employed to create a minimum gap or volume while maintaining an essentially complete fluid type enclosure. This is significant to minimize possible material loss and long life in the connection. The coupler employs an over-center toggle latch to permit tight closure of the coupler onto the pipe ends. Although such couplers have found wide acceptance in the industry, a continuing problem exists in the field with respect to the life of the structures. Thus the continued reuse with the assembly and disassembly of the pipe section tends to result in a disruption of the sealing surfaces such as a rolling of the adjacent edges. This may result in a slight offset of the coupling with a weakened juncture. Under high pressure pumping, particularly with very long lines where high pressure surges are encountered, disruption of the joint may actually occur with a consequent resulting loss of material and, more important, significant down time of the total system while the joint is repaired. Thus, very special care is normally taken in checking the coupler and pipe ends to maintain reliable pumping continued operation. However, such systems are inherently dependent upon the reliability and skill of the workmen.

SUMMARY OF THE PRESENT INVENTION

The present invention is particularly directed to an improved pipe coupling apparatus to permit high pressure pumping of concrete and the like with a reliable connection between the pipe sections.

In accordance with the invention, the sealing gasket includes an annular body having a central, internal, annular projection adapted to project inwardly between the two adjacent pipe sections. The inner surface of the ring member immediately adjacent such projection is grooved to define an annular chamber in the unstressed state of the gasket. These chambers are made of a minimum size to form a tight joint without entrapment of significant volume of the pumped material. The axially outer end sidewalls of the grooves are relieved slightly to locate the outer edge of the groove inwardly of the base connection to define very slight projections or lips in sealing engagement with the conduit with a relatively large sealing volume immediately adjacent thereto. The ends of the pipe section are, in one embodiment, also inclined slightly such that the lip edge is aligned therewith.

In another embodiment, the tongue-like projection has a pointed or triangular cross-section to define a pair of inclined surfaces located between the opposed pipe ends.

Although either form of projection particularly with the small side chambers provides a very satisfactory and improved seal, the triangular cross-section is advantageous in initial assembly. Thus, problems of alignment may arise which may be difficult to overcome or may not be noticed during the assembly. The solid T-shaped projection may not compress or may compress only with great difficulty and interfere with the initial assembly. The pointed or V-shaped projection provides improved assembly without adversely affecting the seal characteristic of the concrete pumping pipe line.

The inventors have found that this provides a very highly improved and practical sealing gasket which minimizes the cavity at the joint while maintaining a high pressure seal. It is particularly advantageous in concrete pumping and the like where the seal does not have to be absolutely fluid tight but should significantly minimize any material loss while maintaining the very high pressure seal against surge pressures and the like.

The present invention has been found to provide a highly improved releasable pipe gasket for coupling of concrete pipe or conduit for concrete placement installation employing high pumping pressure.

BRIEF DESCRIPTION OF THE DRAWING

The drawing furnished herewith illustrates a preferred construction of the present invention disclosing the best mode in carrying out the present invention and in which the above advantages and features are clearly disclosed as well as others which will be readily understood from the following description.

In the drawing:

FIG. 1 is an elevational view of a coupling interconnecting a pair of concrete conduit members constructed in accordance with portions broken away and sectioned to illustrate details of the present invention;

FIG. 2 is a vertical section taken generally on line 2—2 of FIG. 1 and illustrating the coupler shown in FIG. 1;

FIG. 3 is an enlarged fragmentary vertical section taken generally on line 3—3 of FIG. 2;

FIG. 4 is a fragmentary view of the coupling gasket shown in FIGS. 1-3;

FIG. 5 is a view similar to FIG. 4 illustrating an alternate sealing gasket forming a part of the coupling; and FIG. 6 is a view similar to FIG. 4 of the alternate gasket shown in FIG. 5.

DESCRIPTION OF THE ILLUSTRATED EMBODIMENT

Referring to the drawing and particularly to FIGS. 1 and 2, a coupling unit 1 is shown releasably interconnecting a pair of metal conduits or pipes 2 and 3 in end-to-end relation to establish a continuous flow path therebetween for pumping of concrete under large pumping pressure. The illustrated coupling unit 1 includes a pair of similar semi-circular sections or members 4 and 5, the opposite end faces of which are generally radially plane surfaces such that with the coupling in the closed position, shown in FIGS. 1 and 2, an essentially complete circular enclosure is provided about the adjacent end pipes 2 and 3. The semi-circular coupling sections 4 and 5 are formed with similar cross-sections and, in particular, as shown in FIG. 1 are generally of a U-shaped construction defining a pair of laterally spaced legs or lips 6 and 7, the inner edges of which are located within radially clamping grooves 8 and 9 formed on the exterior surfaces of the pipes 2 and 3 adjacent the ends. The illustrated coupling unit 1 is generally similar to that disclosed in the previously identified U.S. Pat. No. 3,705,737. The semi-circular coupling sections 4 and 5 are interconnected at one end by hinge pin 10 and at the opposite end by a releasable toggle latch 11 including a manually operable handle 12 which permits the release and opening of the coupling unit 1 with respect to the pipes 2 and 3 for assembly and disassembly of the pipe sections. The coupling legs 6 and 7 and the grooves 8 and 9 to form a liquid-tight and physically firm connection and, in the illustrated embodiment, include the similar stepped connecting surfaces 13 and 14 to form a first or primary seal and a second or secondary seal in the closed position. The present invention is particularly directed to an inner deformable gasket and one embodiment of a unique circular sealing gasket 15 located within the U-shaped cavities of the couplers in overlying relationship to the ends of pipes 2 and 3 is shown in FIGS. 2 and 4 to establish an improved liquid-type joint.

Thus with the coupling unit 1 in the closed position, as shown in FIGS. 1 and 2, the physical interengagement of the coupling members 4 and 5 with the pipe ends 2 and 3 at the stepped connections 13 and 14 create a firm physical interengagement therebetween to maintain the aligned location of the pipe sections 2 and 3 relative to each other and the gasket 15 provides a liquid-tight joint.

As the particular construction of the hinge construction and toggle assembly of the coupling unit may be of any desired construction, no further detailed description thereof is given.

The invention, as previously noted, is particularly advantageously applied to a concrete placement system where steel end couplings or pipes are employed. Pipes 2 and 3 may be elongated sections or may be special end members secured to a flexible conduit.

Referring particularly to FIG. 3, the pipe end groove 8 is formed with an elongated longitudinal base 16, with the longitudinally outermost sidewall 17 spaced from the coupler 1 to permit ready introduction of the coupling leg 6. The coupling means 13 has the opposite grooved end spaced inwardly from the end face 18 of pipe 2 and is formed as a stepped end sidewall including the base wall 16 of the groove 8 and an intermediate level or wall 19 generally, centrally of the depth thereof and in the principal outer, tubular plane of pipe 2. The intermediate wall 19 is connected to the base wall 16 by a generally, radially extended wall 20 which is inclined slightly in the longitudinal or axial direction from the base wall 16 toward the pipe end 18. The outermost end of the pipe section is enlarged to define a further similarly inclined wall 21 extending from the intermediate wall 19 to the outer periphery of the end of the pipe 2. The pipe end can be formed in any suitable manner with the groove. For example, the pipe end can be formed with the groove 8 and the enlarged end formed by rolling of the pipe body.

The adjacent side leg 6 of the coupling 1 is similarly shaped with an inner flat or planar radially outer face 22 connected to an inner intermediately located wall 23 by an inclined sidewall 24 generally extending parallel with the first sidewall 20 of the groove 8. The intermediate ledge or wall 23 of the leg 6 is coupled to the base 25 of the cup-shaped cavity by a further inclined sidewall 26.

The coupler cavity defined by legs 6 and 7 is generally a frustoconically shaped cavity with the base 25 of a width slightly less than the spacing of the secondary clamping walls 21 and 21' of the grooves 8 and 9.

The gasket 15 is located within the cavity encircling the end sections 2 and 3 and particularly the enlarged end portions thereof. Gasket 15 is a resilient, rubber-like member having a T-shaped cross-section with a ring-like solid portion 27 and a centrally located projection of rectangular cross-section wholly or partially extended between opposed end faces 18 and 18' of sections 2 and 3. The outer sidewalls of the gasket 15 are slightly inclined and the base is generally flat to conform to the shape of the cavity and particularly walls 26 and 26', as most clearly shown in FIG. 4. Further, the inner ring surfaces immediately adjacent to the projection 28 are recessed as at 29 and 30 to define a slight chamber immediately adjacent to the projection. The axially outer walls of the recesses 29 and 30 are similarly formed relieved slightly with the walls inclined slightly to form a small, feathered type lip 30a engaging the pipe section, as most clearly shown in FIGS. 3 and 5. Thus, as shown most clearly in FIGS. 3 and 4, each chamber 29 and 30 has a width approximately similar to the width of the tongue 28 and a somewhat more shallow depth. When the gasket 15 is applied to the end pipe sections 2 and 3, the gasket 15 is deformed to locate the sealing lip 30a in firm engagement with chamfered portion 32 of the pipe section, as shown in FIGS. 3 and 4, and to further reduce somewhat the slight chamber formed by the small recesses 29 and 30. In the compressed or closed coupling state, the small lips maintain a relatively large chamber opening and thus minimize any entrapment recesses within the chamber. The inventors have found that the small recesses in combination with the small lip produce a reliable seal which minimizes the build-up of material within the gasket. Thus, any fluid medium which escapes through the gap into the annular chambers 29 and 30 creates a pressure engagement between the lip and the adjacent chamfered portion 32 of the pipe section. Applicants have found that the open annular recess 29 or 30 with the slightly relieved sidewall provides a highly efficient seal while permitting convenient assembly and disassembly of the gasket with respect to the end pipes.

In operation, when the coupler 1 is closed onto the pipe end sections 2 and 3, the first radial clamping walls 24 and 24' of the side legs 6 and 7 engage the inner longitudinally spaced clamping walls 20 and 20' of the grooves 8 and 9. The intermediate ledge 19 and 19' of the grooves 8 and 9 is of a slightly longer longitudinal extent than the intermediate ledge or wall 23 and 23', of the clamping legs 6 and 7 such that the secondary clamping walls 21 and 21' are spaced from each wall 26 and 26' as shown in FIG. 3. This thus, establishes a first positive mechanical connection to locate and support the pipe sections 2 and 3 relative to each other, with the gasket tightly clamped in position to establish a generally liquid-tight joint.

The coupling unit 1 and pipe sections 2 and 3 may be assembled and disassembled many times with the seal established as in FIG. 3. With time, however, the sealing walls and particularly the edge portions between the inclined sidewall and the intermediate ledge have a tendency to be disrupted either through the use encountered and/or as a result of the connection and disconnection of the coupling. As a result, one or both of the first coupling walls may be destroyed partially or wholly allowing the pipe sections to move from axial alignment and creating a weak connection. When a high pumping pressure is created the junction may fail. Any disruption which would tend to destroy the effectiveness of the mechanical connection merely results in the secondary clamping wall or walls 26 and 26' of the coupling legs 6 and 7 moving into engagement with the second clamping walls 21 and 21' of the grooves 8 and 9 to maintain firm mechanical interengagement.

An alternate embodiment of the invention is illustrated in FIGS. 5 and 6 which is particularly adapted to interconnecting relatively small diameter pipe sections of a concrete pumping system. In the assembly of elongated, rigid pipe sections misalignment between the pipe ends is often encountered. The pipe section must then be manually, forcibly aligned to accommodate the pipe gasket and the coupling to ensure proper sealing of the joint. The conventional essentially rectangular projection such as employed in the concrete pumping industry and such as shown in the first embodiment has been found by the inventors to create difficulty in properly realigning of the sections, and misalignment may not be noted until after the section has been completed and the high pressure pumping initiated. An improved and simple cross-section of the gasket projecting member, particularly for relatively small couplings, is illustrated in FIGS. 5 and 6.

The elements of the second embodiment of the invention corresponding to the elements of the first embodiment are identified by corresponding numbers for simplicity and clarity of explanation.

Thus, the second embodiment of FIGS. 5 and 6 is illustrated applied to a pair of pipe sections 2 and 3 having the double-stepped clamping grooves 8 and 9 and a pair of semi-circular coupling members 4 and 5 similarly interconnected within the groove. In accordance with the embodiments of FIGS. 5 and 6, a modified gasket 33 is located within the cup-shaped members 4 and 5 to seal the end pipe sections under the high pumping pressures encountered in concrete pumping systems and the like.

In the second embodiment of the invention, the sealing gasket 33 is again formed with a very substantial body section 27 essentially corresponding to that of the first embodiment. The gasket 33, however, is formed with a pointed projection or tongue 34 rather than the rectangular shaped tongue of the first embodiment. Further, the tongue 34 projects slightly outwardly of the inner circumferential surface 31 of the unstressed gasket 33 and somewhat less than that of the first embodiment.

As in the previous embodiment, the chambers 29 and 30 defined by the tongue 34 and outer sidewalls are relatively small and the outer sidewalls are again inclined as in the previous embodiment to define small sealing lips immediately adjacent and spaced outwardly of the tongue 34. The small chambers 29 and 30 have a width generally of the order of the average width of the tongue and a corresponding depth in the embodiment of FIGS. 5 and 6. The base portion 27 is a substantial heavy body having a total depth equal to approximately four times the depth of the chambers in both embodiments. Although the precise size of the chambers is not critical, they are selected to present a minimum volume which provides a pressure transfer force on the lips outwardly into sealing engagement with the pipe sections 2 and 3 without creating significant entrapment pockets. The opening to the chambers 29 and 30 in the collapsed position is essentially the same as in the original state. Thus, the inclined sidewalls of the shallow annular recesses are deflected inwardly a relative short distance and do close the entrance to such chambers.

For example, in one typical construction of a 6½ inch diameter and 1 inch wide gasket the sidewalls of the recesses and tongue were parallel and 30° to the center plane through the gasket. The base of the projection was ¼ inch and the width of the recess was 9/64 and the depth about 7/32 inch. The outer wall of the base was angled at 3½ degrees and the outer periphery at 5 degrees.

In this embodiment of the invention, the pointed tongue is generally a right-triangular, cross-section member which projects more readily inwardly between misaligned pipe sections and acts as an alignment guide during initial assembly and has been found to significantly facilitate such assembly.

In operation, the gasket functions essentially in the same manner as that of the first embodiment. The inward projection 34 locates the pipe section with an appropriate sealing action as a result of the collapsing or closing of the coupling members 4 and 5, with the inclined clamping edge surface on members 4 and 5 tending to pull the pipe sections 2 and 3 together against the tongue 34 to establish a tight joint. Any leakage which may occur into the chambers 29 and 30 results in a corresponding fluid pressure within such chambers to again seal the lips against the pipe section and thereby tending to increase the sealing characteristic. The second embodiment functionally after assembly is of the same characteristic as that of the previous embodiment. However, initial assembly is significantly improved as a result of the triangular shaped guide action provided by the triangular shaped tongue.

The present invention thus provides a highly improved gasket for concrete pumping systems for providing a necessarily tight joint between the interconnected pipe sections and preventing disruption of the joint as a result of the high pumping pressure encountered in concrete pumping and the like.

Various modes of carrying out the invention are contemplated as being within the scope of the following claims, particularly pointing out and distinctly claiming the subject matter which is regarded as the invention.

We claim:

1. A coupling gasket member adapted to be located within a cavity of a pipe end coupler for connecting aligned pipe members carrying a pressurized fluid medium, comprising a base ring portion formed of solid flexible material and having a centrally located and integrally connected inner projecting member adapted to extend between said pipe members with said ring portion overlying the pipe members, said ring portion having an inner peripheral wall including a pair of small annular recesses one to each side of the projecting member, said projecting member extending outwardly from the inner peripheral wall and of said recesses, each of said recesses having a width at the peripheral wall on the order of the maximum width of the projecting member at the inner peripheral wall and a depth less than said width of said projecting member and substantially less than one half the depth of the ring portion and being located immediately adjacent to the projecting member, the axially outer sidewalls of the recesses being slightly inclined along substantially the total depth of the recesses to define a sealing lip at the inner peripheral wall surface deflected inwardly by the pipe member into a sealing position and maintaining said sealing lip spaced from said inner projecting member in the deflected sealing position by substantially the width of the recess with the lip deflected inwardly, said projecting member extending substantially beyond said peripheral wall in the non-sealing position and in the sealing position of the gasket.

2. The coupling gasket member of claim 1 wherein said inner peripheral wall surface inclines radially inward toward the center of the ring portion with the lip spaced from said projecting member.

3. The coupling gasket member of claim 1 wherein said recesses have an essentially rectangular cross-section of width greater than the depth in the unstressed state of the member and in the sealing position of the member.

4. The coupling gasket member of claim 3 wherein the projecting member extends radially inwardly of the inner peripheral wall.

5. The coupling gasket member of claim 1 wherein said recesses have an essentially rectangular cross-section in the unstressed state of the member and in the sealing position of the member, the projecting member extends radially inwardly of the inner peripheral wall and said inner peripheral wall surface being inclined radially toward the center of the ring portion with the lip spaced from said projecting member.

6. The coupling gasket member of claim 1 wherein said projecting member is a triangular shaped member symmetrical about a center plane through the base ring portion with the width at the plane of the periphery wall being on the order of the width of the recess.

7. An annular coupling gasket member adapted to be located within an annular cavity of a pipe end coupler for connecting of a pair of pipe sections end-to-end to seal the junction against a pressurized fluid medium in said pipe sections, comprising a heavy ring base portion of a solid flexible material with a centrally located inner projecting member extending substantially inwardly of an inner peripheral wall and adapted to be located between the ends of said pipe sections, said inner peripheral wall having a pair of small annular recesses one to each side of the projecting member and each having a width at the peripheral wall on the order of the width of the projecting member and having a depth less than said width of the projecting member at the peripheral wall and substantially less than one half the depth of the base portion and being located immediately adjacent to the projecting member, the axially outer sidewalls of the recesses being slightly inclined along substantially the total depth of the recesses to define a sealing lip at the inner peripheral wall surface, said sealing lip being deflected inwardly from an unstressed state and said recesses being subjected to the fluid pressure within the pipe sections, said base portion being substantially deeper than said recesses and maintaining said sealing lip spaced from said inner projecting member by substantially the width of the recess at the peripheral wall in both the unstressed state and in the sealing position.

8. The coupling gasket member of claim 7 wherein said projecting member has a triangular cross-section.

9. The coupling gasket member of claim 7 wherein said projecting member has a triangular cross-section having sidewalls parallel to said outer sidewalls of the said recesses.

10. The coupling gasket member of claim 7 wherein said inner peripheral wall surfaces are totally inclined radially inward toward the projecting member with the lip spaced from said projecting member by more than one-half the width of the base of the recess.

* * * * *